Sept. 4, 1962 V. K. ZWORYKIN ET AL 3,052,232
VOLTAGE SENSING APPARATUS
Filed Feb. 23, 1961 2 Sheets-Sheet 2
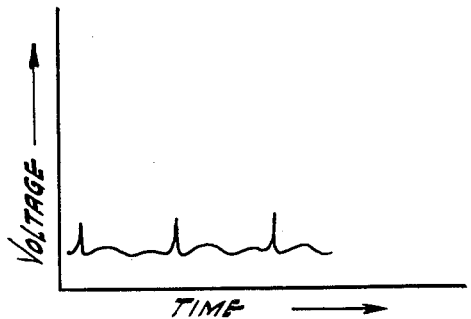
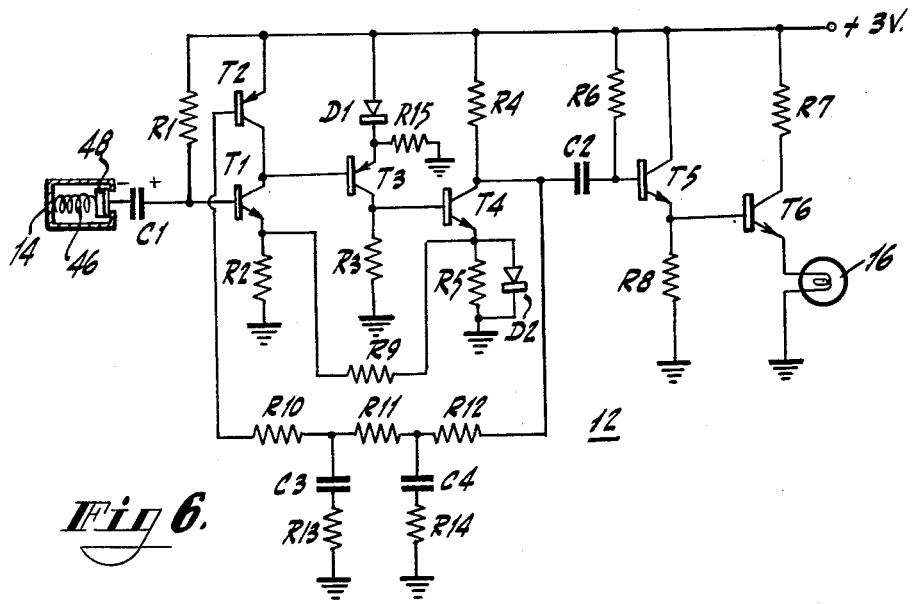
INVENTORS
VLADIMIR K. ZWORYKIN
& FRED L. HATKE
BY
Attorney United States Patent Office 3,052,232
Patented Sept. 4, 1962

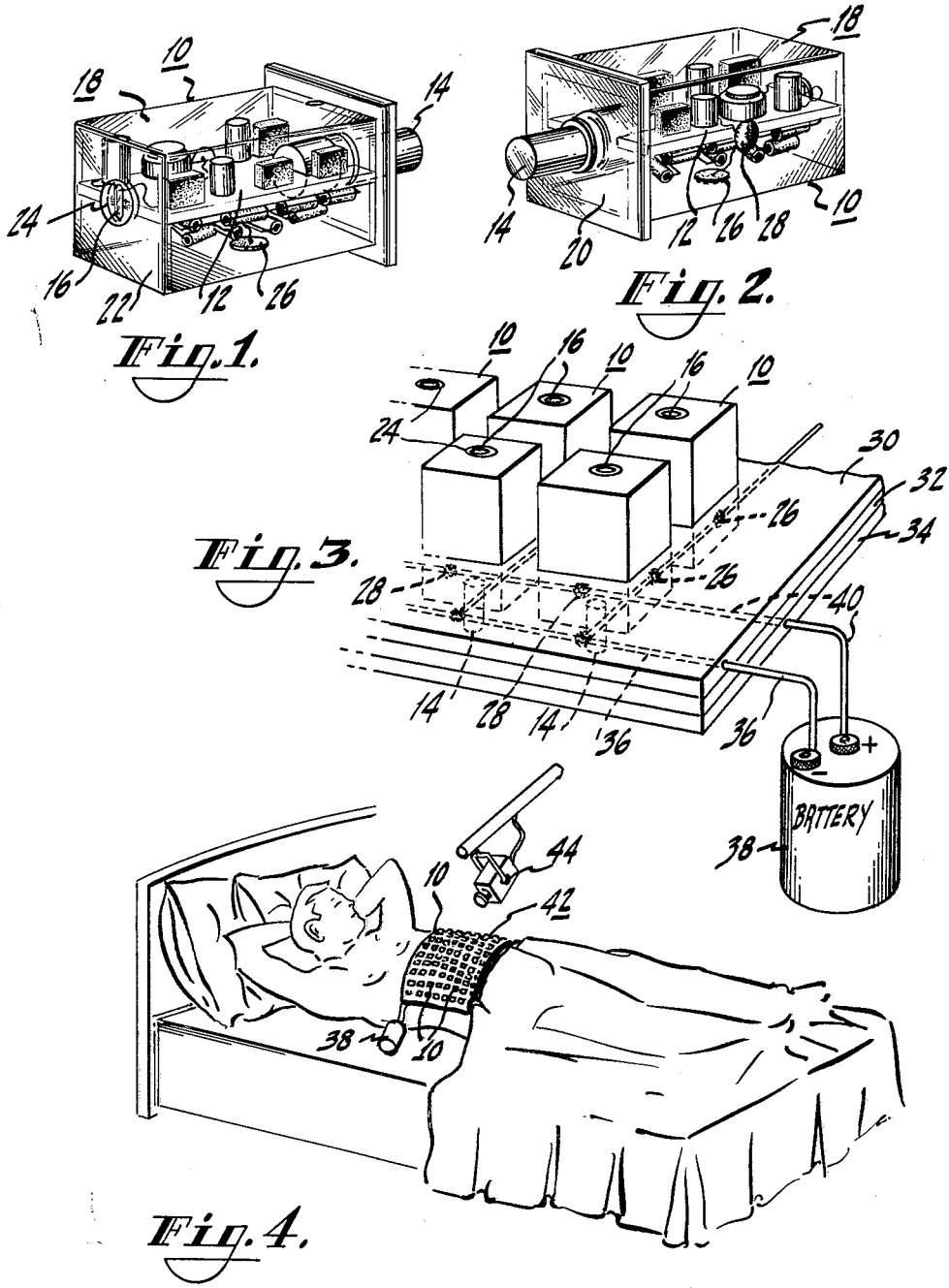

3,052,232
VOLTAGE SENSING APPARATUS
Vladimir K. Zworykin, Princeton, and Fred L. Hatke, Union City, N.J., assignors to Radio Corporation of America, a corporation of Delaware
Filed Feb. 23, 1961, Ser. No. 91,261
9 Claims. (Cl. 128—2.1)

This invention relates generally to voltage sensing apparatus, and more particularly to improved apparatus, in modular form, for indicating simultaneous changes in the potentials at different locations on a living body by simultaneous changes in the intensities of lights from an array of lamps. The apparatus of the present invention is particularly useful in the fields of medical research and diagnosis for indicating visually changes in skin-potentials at different locations within a prescribed area of a living body over a period of time.

It is well known in the medical field that heart and brain activities cause voltage changes to occur at different locations on a living body. These changes in potential are related to the psychological and physiological activities of the body and are usually periodic in character. Electrocardiograph and electroencephalograph records of a person are made, for example, by indicating the changes in potential occurring between specific locations on the body of the person. It has been proposed to measure changes in potentials at regularly spaced locations within a prescribed area of a human body by employing conventional electrocardiographic or electroencephalographic equipment. However, prior art equipment of this type requires the use of relatively long electrical connections between the body and the equipment and between the equipment and such visual display means as may be employed in connection therewith. Since the unamplified skin-potentials measured in this manner are usually relatively weak, any alternating current hum and/or stray electrical interference induced in the electrical connections from the electrodes or from the visual means to the amplifiers will cause undesirable signals that interfere with and distort the visual display of the amplified skin-potentials. Also, an arrangement of prior art equipment for measuring a plurality of skin-potentials simultaneously is unwieldy from a practical point of view.

Accordingly, it is an object of the present invention to provide improved voltage sensing apparatus that is relatively small in size compared to prior art apparatus and that eliminates the necessity for long electrical connections to and from an amplifier.

Another object of the present invention is to provide improved voltage sensing apparatus that comprises an amplifier including input sensing means and output indicating means in a relatively small, self-contained, modular unit, thereby eliminating artifacts usually induced in long electrical connections by stray electrical disturbances.

Still another object of the present invention is to provide improved voltage sensing apparatus for measuring skin potentials at a plurality of locations within a prescribed area by utilizing an array of relatively small, self-contained, substantially similar modular units.

A further object of the present invention is to provide novel voltage sensing apparatus that is relatively simple in construction, very reliable in operation and highly efficient in use.

In accordance with the present invention, the improved voltage sensing apparatus comprising an assembly of a plurality of self-contained modular units for indicating changes in the voltages at different locations on a living body. The changes in voltages may be observed by any suitable indicating means, as by changes in the intensities of lights from lamps, for example. Each of the modular units comprises a transistorized amplifier whose input means include a probe electrode and whose output means include a miniature lamp. The amplifier is enclosed in a casing through which the probe electrode extends, and the lamp is visible through a window in the casing. The self-contained modular units are so small that a regularly spaced array of about 100 modular units may fit easily and comfortably on the chest of a man, for example, to indicate the potential changes taking place in this area. The self-contained modular units are disposed within regularly spaced openings formed in at least one flexible sheet of insulating material. The modular units are oriented so that their probe electrodes are accessible from one side of the sheet and their lamps are visible from the other side of the sheet. The sheet may include electrical wiring therein to connect the modular units in parallel and to supply them with a common source of operating voltage. Thus, an array of modular units may be placed over a person's chest to indicate, by changes in the intensities of the lights from the lamps, voltage changes taking place at the locations where the probe electrodes contact the person's skin. The light patterns thus derived are usually periodic in character and may be photographed by a movie camera or recorded by other means for study at a later time.

The novel features of the present invention, both as to its organization and method of operation, as well as additional objects and advantages thereof, will be more readily understood from the following description, when read in connection with the accompanying drawings, in which the same reference characters refer to similar parts, and in which:

FIGURE 1 is a perspective view of a self-contained modular unit disposed on one of its sides, with the top wall of the unit at the left, of an embodiment of the voltage sensing apparatus in accordance with the present invention;

FIGURE 2 is a view similar to FIGURE 1 but with the bottom of the unit shown at the left;

FIGURE 3 is a perspective, fragmentary view of one form of voltage sensing apparatus according to the present invention, showing a plurality of self-contained modular units supported and connected as an array of modular units;

FIGURE 4 is a perspective view of the voltage sensing apparatus of FIGURE 3 applied to a portion of a person's body for indicating and recording voltage changes occurring thereat;

FIGURE 5 is a graph indicating changes in voltage with respect to time that may occur at a particular location on a living body; and FIGURE 6 is a schematic diagram of an embodiment of the transistorized amplifier, probe electrode, and output lamp that are included in the self-contained modular unit shown in FIGS. 1 and 2.

Referring, now, particularly to FIGS. 1 and 2, there is shown a self-contained modular unit 10 comprising a transistorized amplifier 12, including a probe electrode 14 in its input means and a miniature lamp 16 in its output means. The amplifier 12 comprises miniaturized components that are included within a casing 18. The casing 18, as indicated in FIGS. 1 and 2, comprises a transparent plastic material, but it will be understood that the casing 18 may be made of electrically conductive material to form an electric and magnetic shield for the amplifier 12, if so desired.

The casing 18 may have the shape of an elongated parallelepiped that has a substantially square cross-section. In practice, a satisfactory amplifier 12, comprising six transistors and associated components, was easily fitted, with space to spare, within a casing whose dimensions were ¾" x ¾" x 2".

The electrode 14 is connected to the input of the amplifier 12 and extends through the bottom wall 20 of the casing 18. If the casing 18 is made of a metal, the electrode 14 should be insulated from the casing 18 by any suitable, known means. The top wall 22 of the casing 18 is formed with a suitable window 24 through which the lamp 16 may be observed. Each modular unit 10 may include, within the casing 18, a source of operating voltage, such as a small battery of the hearing-aid type, if so desired. However, when a plurality of modular units 10 are arranged in an array to form the voltage sensing apparatus of the present invention for indicating voltage changes at a plurality of locations, contacts 26 and 28 are provided in each modular unit 10 for connecting all of the modular units to a common source of power in parallel. The contacts 26 and 28 are connected to the amplifier circuit 12 and provide means to apply a source of operating voltage to the amplifier 12. The contacts 26 and 28 extend through the walls of the casing 18 for this purpose, as will be explained hereinafter in greater detail.

Referring, now, to FIG. 3, there is shown an array of similarly oriented, regularly spaced, self-contained, modular units 10 for indicating changes in the skin-potentials at a plurality of locations within a prescribed area on a living body, for example. The units 10 are disposed snugly within regularly spaced openings in one or more flexible sheets. In the embodiment of the voltage sensing apparatus shown in FIG. 3, each of the modular units 10 extends through three sheets of flexible material, namely, a top sheet of "Neoprene" 30, a middle sheet of foam rubber 32, and a bottom sheet of "Neoprene" 34. The sheets 30, 32 and 34 may, however, comprise sheets of any other suitable, flexible insulating material.

The top sheet 30 has a network of electrical conductors 36 therein, arranged in a manner to connect all of the contacts 26 to each other and to a lead to the negative terminal of a common source of operating voltage, such as a battery 38. The lower sheet 34 also has a network of electrical conductors 40 therein for connecting all of the contacts 28 to each other and to a lead to the positive terminal of the battery 38. The modular units 10 are disposed substantially perpendicular to the sheets 30, 32, and 34 when the sheets are flat and lie in parallel planes. The modular units 10 may be fixed with respect to the sheets 30, 32, and 34 by friction or by any other suitable means. The modular units 10 are oriented so that their lamps 16 are visible from one side of the sheet 30, and their probe electrodes 14 are accessible from the other side of the sheet 34. The sheets 30, 32, and 34 are sufficiently flexible so as to conform to the contour of an area of the body that includes the locations at which the changes in voltage are to be detected, as shown in FIG. 4. The sheets 30, 32 and 34 may be held together in a stack by any suitable means.

In FIGURE 4, an array 42 of modular units 10 is shown disposed over the chest and upper abdomen of a person in a manner whereby each of the probe electrodes 14 makes contact with a different one of a plurality of locations within the area covered by the array 42. Changes in the potential with respect to time, occurring at the locations where the electrodes 14 contact the skin, are indicated instantaneously by changes of intensities of the lights from the lamps 16. The potentials sensed by each of the probe electrodes 14 may be compared with a reference voltage, such as the negative terminal of the battery 38 or the skin-potential at a predetermined portion of the body. These changes in potential may be observed visually, or they may be photographed by a suitably placed camera 44. The camera 44 may record the light changes at high speeds, and the recorded information may be reproduced at a relatively slower speed for detailed observation. The recording may be done through photographic or through television means. A typical change in voltage with respect to time, as observed from a single lamp 16, is shown in FIG. 5. The units of voltage and time in this graph are relative units. The amplifier 12 may comprise any amplifier that is capable of amplifying the relatively weak skin-potentials to an amplitude such that variations in the skin-potential will cause corresponding variations in the intensity of light from the lamp 16.

Referring, now, to FIG. 6, there is shown a schematic diagram of an amplifier 12 that has been found suitable for the purpose described. The input probe electrode 14 is shown as adjustable along its longitudinal axis to insure a good electrical contact at any location on a living body, regardless of the contour of that location on the body. Thus, the electrode 14 is spring-biased outwardly by a spring 46 disposed between the hollow, cylindrically-shaped electrode 14 and a fixed contact 48. As shown in FIG. 6, the probe electrode 14 is capacitively coupled to the input of the amplifier circuit 12, and the lamp 16 is connected in the output circuit of the amplifier 12.

Since the particular circuitry of the amplifier 12, as shown in FIG. 6, does not form a part of the instant invention, other amplifiers providing the same degree of amplification also being suitable, and since the operation of such amplifiers is well known to those skilled in the art, the detailed operation of the amplifier 12 will not be described. The types and values of the various components illustrated in the schematic drawing of FIG. 6 that have been found suitable for the amplifier 12 are:

| | |
|---|---|
| $T_1 = 2N1010$ | $R_3 = 10K$ ohms |
| $T_2 = 2N105$ | $R_4 = 2.2K$ ohms |
| $T_3 = 2N105$ | $R_5 = 220$ ohms |
| $T_4 = 2N647$ | $R_6 = 100K$ ohms |
| $T_5 = ST1070$ | $R_7 = 39$ ohms |
| $T_6 = 2N647$ | $R_8 = 15K$ ohms |
| $D_1 = 1N482$ | $R_9 = 6.8K$ ohms |
| $D_2 = 1N482$ | $R_{10} = 82K$ ohms |
| $C_1 = 68$ μf. | $R_{11} = 100K$ ohms |
| $C_2 = 68$ μf. | $R_{12} = 100K$ ohms |
| $C_3 = 68$ μf. | $R_{13} = 10K$ ohms |
| $C_4 = 68$ μf. | $R_{14} = 1K$ ohms |
| $R_1 = 270K$ ohms | $R_{15} = 2.2K$ ohms |
| $R_2 = 100$ ohms | |

A three-volt, dry-cell battery may be used to energize the amplifier 12. The final stage of the amplifier 12, using the above values of the components, supplies current to the miniature lamp 16 rated at 15 milliamperes at 1.3 volts. A direct-current feedback loop from the collector of the transistor T4 to the base of the transistor T2 stabilizes the direct-current operating point of the transistors. The gain of the amplifier 12 is stabilized and the response decay at frequencies of the order of 300 cycles/second is determined by the negative feedback loop joining the emitters of the transistors T1 and T4.

From the foregoing description, it will be apparent that there has been provided voltage sensing apparatus comprising an array of similarly oriented, regularly spaced, similar, modular units. Each unit is a self-contained module comprising an amplifier circuit with its input and output means. Each modular unit is enclosed in a casing, an adjustable probe electrode extending from its bottom wall, and a lamp being visible through a window in its top wall. Because each modular unit includes both the input probe electrode and the output lamp, long electrical connections between the amplifier and the input and output means are eliminated, thereby reducing the possibility of producing unwanted artifacts by stray electrical disturbances. The small size of each self contained modular unit and the novel arrangement of these modular units to sense skin-potentials and to provide an array of visual signals, as described, make the voltage sensing apparatus of the present invention a novel, practical, and easily usable tool in the field of medical research and diagnosis. It will be apparent, however, that the voltage sensing apparatus of the present invention is not limited to use with only a living body but is capable of efficient use with any body having areas subject to potential variations.

What is claimed is:

1. Apparatus for indicating changes in a characteristic of a body at an area on said body, said apparatus comprising a plurality of substantially similar, self-contained modular units, each of said units comprising a casing, an amplifier circuit within said casing, said amplifier circuit including input means comprising a probe electrode extending through said casing and being positionable unitarily with said casing, said amplifier circuit also including output means comprising visual indicating means visible from without said casing, and means to position said electrodes of said units at different locations, respectively, over said area in an array so that all of said visual indicating means may be observed simultaneously.

2. Apparatus as defined in claim 1 wherein said means to position said units in said array comprise at least one sheet of flexible insulating material formed with a plurality of openings therein, said units being disposed through said openings, respectively, with said probe electrodes being accessible from one side of said sheet and said visual indicating means being observable from the other side of said sheet.

3. Apparatus as defined in claim 2 wherein each of said units comprises, in addition, a pair of contact means connected to said amplifier circuit and extending through said casing for applying a source of operating potential to said amplifier circuit, and said means for positioning said units in a regularly spaced array comprise means associated therewith for connecting said source of operating potential to each of said pairs of contact means.

4. Voltage sensing apparatus for indicating changes in the voltages at a plurality of locations within an area on a living body by changes in the intensities of light from an array of lamps, said apparatus comprising a plurality of substantially similar self-contained modular units, each of said units comprising a casing, an amplifier within said casing, said amplifier comprising input means including a probe electrode extending through a wall of said casing, said amplifier circuit also including output means comprising one of said lamps, said casing being formed with a window through which said one lamp may be observed, flexible sheet means formed with a plurality of regularly spaced openings therein, said modular units being disposed within said openings, respectively, and being similarly oriented with respect to said sheet means, said lamps forming said array of lamps observable from one side of said sheet means, and each of said probe electrodes being adapted to make contact with one of said plurality of locations, respectively, when said sheet means are placed over said area.

5. Voltage sensing apparatus as defined in claim 4 wherein said electrodes are resiliently adjustable with respect to said casing.

6. Voltage sensing apparatus as defined in claim 4 comprising, in addition, a pair of contacts extending through said casing of each of said units, means connecting said contacts to said amplifier circuit for applying a source of operating potential thereto, and electrical connections supported by said sheet means and connected to said contacts to apply said source of operating potential to said plurality of amplifier circuits.

7. A self-contained modular unit for indicating changes in a characteristic of a living body at a location on said body, said unit comprising a casing, and an amplifier circuit including input means and output means within said casing, said input means comprising a probe electrode extending through said casing and being movable bodily with said casing in certain directions only upon movement of said casing in said directions for positioning said electrode at said location to sense said characteristic, said output means comprising visual indicating means, and said casing being formed with a window through which said visual indicating means may be observed.

8. A self-contained modular unit as defined in claim 7 comprising, in addition, a pair of contact means connected to said circuit and extending through said casing for applying a source of operating potential to said circuit.

9. A self-contained modular unit as defined in claim 7 wherein said visual indicating means comprises a lamp whose intensity of light varies with changes in said characteristic.

References Cited in the file of this patent

UNITED STATES PATENTS

| 1,154,934 | Pilling | Sept. 28, 1915 |
| 1,282,908 | Miller | Oct. 29, 1918 |
| 1,494,586 | Cary | May 20, 1924 |
| 1,600,296 | O'Malley | Sept. 21, 1926 |
| 1,748,403 | Wentworth | Feb. 25, 1930 |
| 2,712,309 | Offner | July 5, 1955 |
| 2,712,975 | Golseth | July 12, 1955 |
| 2,744,521 | Schmid | May 8, 1956 |
| 2,994,324 | Lemos | Aug. 1, 1961 |